Nov. 28, 1961  R. G. SHELLEY  3,010,676
MISSILE GUIDANCE SYSTEM
Filed Nov. 25, 1955  2 Sheets-Sheet 1

*INVENTOR.*
RULON G. SHELLEY
BY
*William R. Lane*
ATTORNEY

United States Patent Office 3,010,676
Patented Nov. 28, 1961

3,010,676
MISSILE GUIDANCE SYSTEM
Rulon G. Shelley, Downey, Calif., assignor to
North American Aviation, Inc.
Filed Nov. 25, 1955, Ser. No. 548,970
17 Claims. (Cl. 244—14)

The invention relates to a missile guidance system. It is particularly adapted for use in short range guided missiles. Inertial guidance is provided without the requirement of a stabilized platform.

Missiles are controlled by schemes that fall into two general types, those requiring information from the outside and those requiring no information from the outside. Of the type of missiles requiring no information from the outside, either some guidance system must be provided or the missile becomes, in effect, a projectile in which deviation from a predetermined trajectory causes an error at the target. It is desirable to provide some sort of guidance system which requires no information from outside sources, thus rendering the device insensitive to jamming, but yet one which allows deviation from a given trajectory, or chosen flight path, and still reaches the target.

As a missile is fired, as for example from a mother ship, and as the missile flies, it experiences angular velocity about its pitch, roll and yaw axes. A guidance system which is capable of determining airspeed and distance traveled must further take into account these angular velocities in order to determine the guidance path with any degree of accuracy.

The device of this invention is provided with initial information concerning target position and, after being fired, computes the target position continuously from the instantaneous missile position. Consequently, the missile constantly has information as to the direction it should travel and the distance to the target, even though it may have previously left the direct course to the target.

It is an object, therefore, of this invention to provide an inertial guidance system for a missile.

Another object of this invention is to provide a guidance system for a missile which continuously computes the range vector to the target during the time of flight.

A further object of this invention is to provide a guidance system which allows deviation of the missile from a given trajectory.

Still another object of this invention is to provide a guidance system utilizing missile angular velocities in computation of flight path.

Another object of this invention is to provide a self-contained guidance system requiring no outside information during time of flight.

It is still another object of this invention to provide a missile guidance system into which is set initial conditions and from which is subtracted the integrated airspeed of the missile in order to determine the remaining flight path to the target.

Other objects of the invention will become apparent from the following description taken in connection with th accompanying drawings, in which FIG. 1 is a diagram of the missile path;

Figure 1:
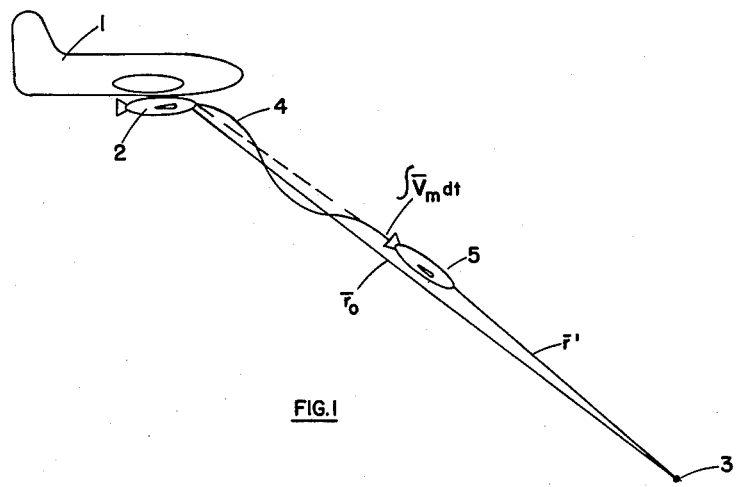

Referring now to FIG. 1, a mother ship 1 carrying a missile 2 approaches a fixed target 3. The initial vector to the target is illustrated as being $\bar{r}_0$ the bar indicating that the vector has direction, and the magnitude of the value being the range. The missile flight path 4 can be seen to vary from the original direct path to the target. Assuming a subsequent missile position at 5, the remaining vector to the target is $\bar{r}'$. At position 5, the missile has traveled a vector which may be represented as $\int \bar{V}_m dt$. Computation of the remaining vector to the target $\bar{r}'$ is determined then as follows:

$$\bar{r}' = \bar{r}_0 - \int \bar{V}_m dt \tag{1}$$

where $\bar{V}_m$ equals missile airspeed and direction.

Figure 2:
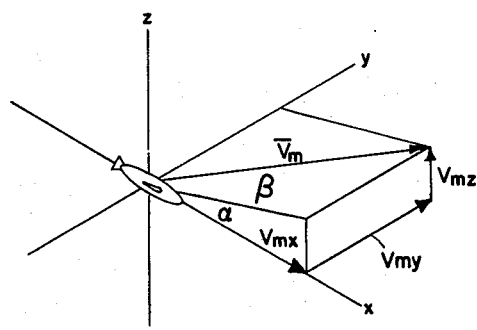
FIG. 2 is a vector diagram showing components of the missile airspeed vector.

The missile airspeed vector may be broken into components shown in FIG. 2, which also illustrates missile angle of skid $\beta$, and missile angle of attack, $\alpha$. The angle of attack $\alpha$ is the angle between the velocity vector of the missile and the plane $xy$ containing the roll ($x$) and pitch ($y$) axes as illustrated in FIG. 2. The angle of skid $\beta$, also known as the angle of side slip or crab angle, is as illustrated in FIG. 2, the angle between the velocity vector of the missile and the plane $xz$ containing the roll ($x$) and yaw ($z$) axes. These angles $\alpha$, and $\beta$ are presumed small but are enlarged in FIG. 2 for clarity. The axes $x$, $y$, and $z$ illustrated in FIG. 2 for purposes of exposition are conventional roll, pitch and yaw axes, respectively, of the missile and comprise a set of mutually orthogonal axes which are at all times fixedly oriented with respect to the missile. The velocity vector $\bar{V}_m$ of the missile may be expressed in terms of three mutually orthogonal components thereof which are directed respectively along the three axes of the illustrated $x$, $y$, $z$ coordinate system. The components (along the roll, pitch and yaw axes) of the missile airspeed vector, $\bar{V}_m$, are obtained from measured magnitude of missile airspeed $V_m$ as shown below:

$$V_{mx} = V_m \text{ (substantially)} \tag{2}$$

$$V_{my} = V_m \beta \tag{3}$$

$$V_{mz} = V_m \alpha \tag{4}$$

It is assumed that the angle of skid $\beta$ is obtained simply by a vane mounted on an axis parallel to the yaw axis outside of the skin of the missile, and that angle of attack $\alpha$ is obtained similarly by another vane mounted on an axis parallel to the pitch axis outside the missile. From information as to static pressure $P_s$, differential pressure $\Delta P$ and stagnation temperature $T_0$, the missile airspeed, $V_m$, is obtained in well-known fashion. The resultant airspeed vector $\bar{V}_m$ may be obtained by summing the three components of the velocity vector along the several axes as expressed in Equations 2, 3 and 4 above. The angle of skid and the angle of attack may, of course, be obtained in other more complicated and more precise fashion. In another manner, the airspeed of the missile may be programed as a function of time, and vehicle airspeed may then be obtained according to the lapse of time after launch. If computed as described above, missile airspeed is obtained. It is readily seen that information may be obtained in other ways such as by radar, or radio beacons, in which case, missile velocity relative to the ground is obtained. The device is applicable to either form of information as to missile motion. "Airspeed" is considered to be one of the ways in which missile velocity may be expressed. Airspeed neglects drift due to wind, for example.

The rate of change in range along $x$ axis, according to vector analysis and the concept of Equation 1 is:

$$\frac{d(r_x')}{dt} = -[V_{mx} - \omega_y r_z' + \omega_z r_y'] \tag{6}$$

The rates of change along the $y$ and $z$ axes, respectively, are:

$$\frac{d(r_y')}{dt} = -[V_{my} - \omega_z r_x' + \omega_x r_z'] \tag{7}$$

$$\frac{d(r_z')}{dt} = -[V_{mz} - \omega_x r_y' + \omega_y r_x'] \tag{8}$$

Literally, Equations 6, 7 and 8 point out that each component of the target range vector will change as a result of missile airspeed and, also because of pitch, roll and yaw. Failure to take such angular velocities into consideration in computing range changes results in errors similar to the familiar cross-roll error in fire control. Mathematically speaking, the last two terms of each of Equations 6, 7 and 8 are cross-products.

Integrating Equations 6, 7 and 8 provide the components $r_x'$, $r_y'$ and $V_z'$ of the remaining range vector to the target:

$$r_x' = r_x - \int [V_{mx} - \omega_y r_z' + \omega_z r_y'] dt \tag{9}$$

$$r_y' = r_y - \int [V_{my} - \omega_z r_x' + \omega_x r_z'] dt \tag{10}$$

$$r_z' = r_z - \int [V_{mz} - \omega_x r_y' + \omega_y r_x'] dt \tag{11}$$

where $r_x$, $r_y$, and $r_z$ are initial ranges to the target along the $x$, $y$ and $z$ axes, respectively.

Figure 3:
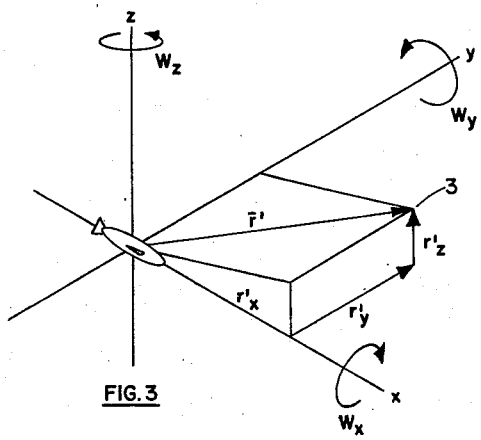
FIG. 3 is a vector diagram showing components of the target range vector.

FIG. 3 illustrates the range vector from position 5 to target 3. The resultant vector is $\bar{r}'$ whose components are $r_x'$, $r_y'$, and $r_z'$. The angles are enlarged again for clarity but are assumed to be small. It may be desirable to fly from position 5 directly along the $\bar{r}'$ vector. However, if the missile has any angle of skid or any angle of attack, the missile may be proceeding crab-wise along the vector. The steering equations of the missile are as follows:

$$\frac{r_y'}{r_x'} - \beta = \text{(steering error in yaw)} \tag{12}$$

$$\frac{r_z'}{r_x'} - \alpha = \text{(steering error in pitch)} \tag{13}$$

This assumes that $r_x'$ is approximately equal to the absolute magnitude of $\bar{r}'$. According to these equations, the missile is steered to proceed along the vector $\bar{r}'$ although it may be pointing in a slightly different direction because of angle of skid and angle of attack. The angles are termed "flight attitude angles relative to the course of travel." That is, the flight attitude of the missile is generally angularly displaced from the line of travel of the missile. Null-seeking servos operate the aerodynamic control surfaces of the missile and are connected to receive signals representing the computed values of Equations 12 and 13. These servos control the aerodynamic surfaces so as to drive the signals to zero.

Figure 4:
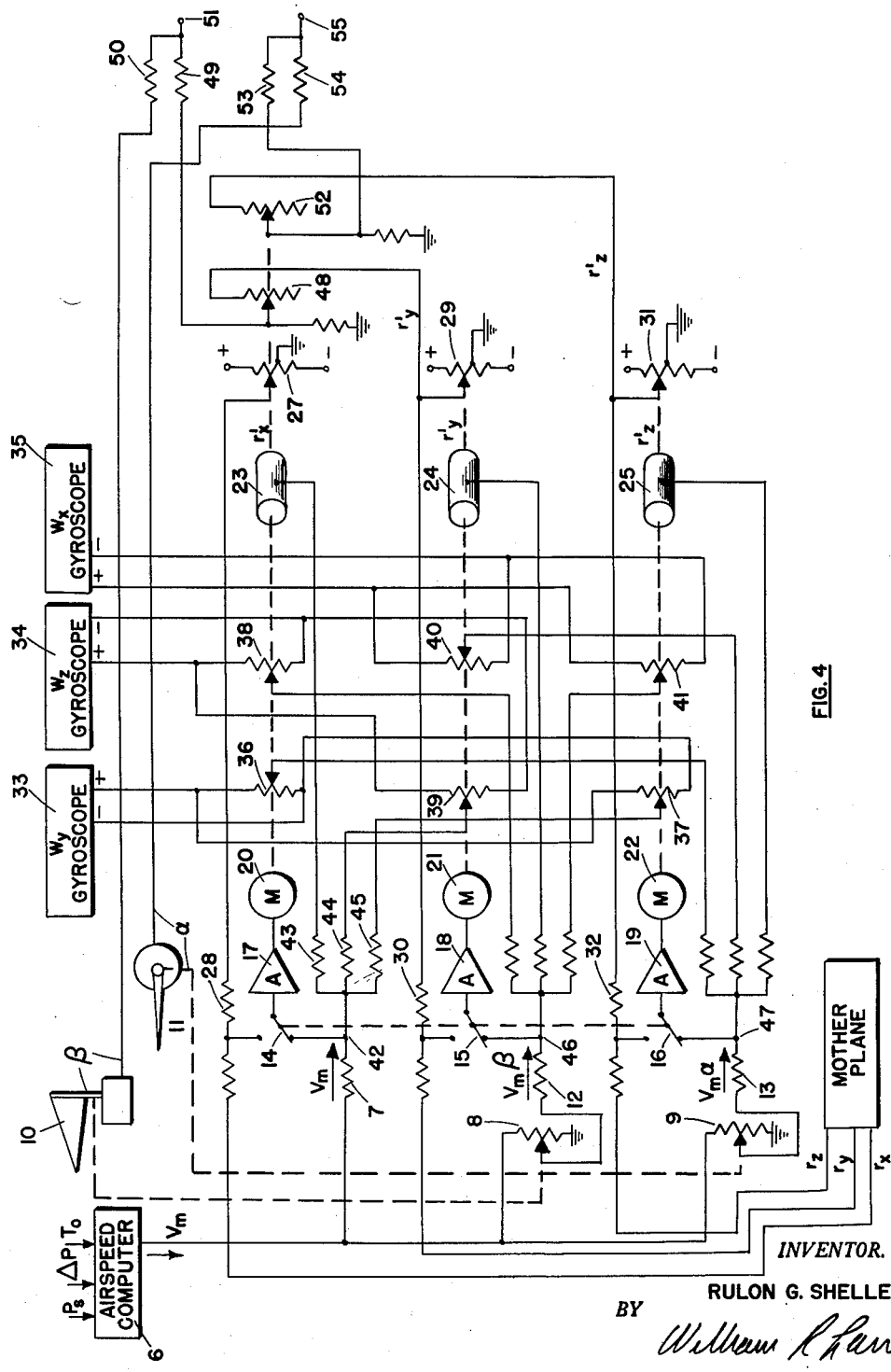
FIG. 4 is the device of the invention providing target range components and steering error signals.

FIG. 4 is a mechanization of the guidance system having due regard to the angle of skid $\beta$, angle of attack $\alpha$, airspeed $V_m$, and angular velocities about the three axes of the missile $\omega_x$, $\omega_y$, $\omega_z$. Computer 6 determines missile airspeed in accordance with input information as to static pressure $P_s$, differential pressure $\Delta P$, and stagnation temperature $T_0$, and provides an electrical signal to resistor 7, potentiometer 8 and potentiometer 9. The wiper of potentiometer 8 is positioned mechanically by angle-of-skid vane 10; and the wiper of potentiometer 9 is positioned mechanically by the angle-of-attack vane 11. At resistor 12, then, is received the component $V_m\beta$ of Equation 3, and at resistor 13, then, is received the component $V_m\alpha$ of Equation 4. Switches 14, 15, and 16, thrown as shown, connect the three components $V_m$, $V_m\beta$, $V_m\alpha$, into amplifiers 17, 18 and 19, respectively, which provide drive signals to motors 20, 21 and 22, respectively. Tachometers, or rate generators, 23, 24 and 25 each provide an electrical signal in negative feedback according to the rate of rotation of motors 20, 21 and 22, respectively. Such motor-tachometer combination provides an integrating device and the number of rotations of the shaft of each motor represents an integral of the input signal to the motor.

The initial range components $r_x$, $r_y$, $r_z$ are received and set into the device from an outside source such as mother plane 1. During this period, and until launch, switches 14, 15 and 16 are thrown to the alternate position from that shown. By the closed loop consisting of amplifier 17, motor 20, tachometer 23, potentiometer 27 and feedback resistor 28, the shaft of motor 20 is servoed to a position representing $r_x$ as received from the mother plane. Potentiometer 29 and resistor 30 provide a feedback loop so that the shaft of motor 21 is servoed to a position representing $r_y$ as received from the mother plane. Potentiometer 31 and resistor 32 provide a similar feedback loop and the shaft of motor 22 is servoed to $r_z$. In this manner, the initial range components are set into the device and from which, after launch, subtractions of integrated velocities and angular rotation will be made in order to arrive at continuously computed remaining range components. (See Equations 9, 10 and 11.)

After launch, the switches 14, 15 and 16 are thrown to the position shown and information is then received from airspeed computer 6 and rate gyroscopes 33, 34 and 35. Gyroscope 33 provides an electrical signal representing the angular velocity in pitch to potentiometers 36 and 37. Gyroscope 34 provides a signal as to angular velocity in yaw to potentiometers 38 and 39. Gyroscope 35 provides a signal of angular velocity in roll to potentiometers 40 and 41. The wiper of each potentiometer is positioned according to the shaft rotation of its respective motor. Each range component along an axis is multiplied by the two angular velocities about the other two axes. (See FIG. 3.) For example, $r_x'$ is multiplied by $\omega_y$, by potentiometer 36, and by $\omega_z$, by potentiometer 38, FIG. 4. Pointing out the mechanization of Equation 9, at point 42 is received a signal representing airspeed, $V_m$ (substantially $V_{mx}$), through resistor 7, the quantity, $r_y'\omega_z$ through resistor 44 and the quantity of $r_z'\omega_y$ through resistor 45. Thus, all the quantities to be subtracted from $r_x$ (see Equation 9) are received at point 42, $r_x$ having been previously entered from the mother ship into the rotation of the shaft of motor 20. These quantities now received at point 42 are to be integrated and subtracted. The natural function of motor 20 and tachometer feedback 23, through resistor 43, is to integrate these quantities. The output of the shaft of motor 20 is then $r_x'$ of Equation 9. Similarly, at point 46, are received the quantities to be subtracted from $r_y$ of Equation 10, the shaft of motor 21 providing the output of $r_y'$. At point 47, similarly, are received the quantities to be subtracted from $r_z$ of Equation 11. The position of the shaft of motor 22 is then $r_z'$.

Potentiometer 48 provides division of $r_y'$ (the signal expressing the yaw component of the remaining range vector) by $r_x'$ (the signal expressing the forward component of the remaining range vector to the target) according to Equation 12 and resistor 49 receives this quantity. This signal represents the yaw error angle. Through resistor 50 is received a signal representing the angle of skid, $\beta$, which is subtracted according to Equation 12 and at point 51 is received the steering error signal in yaw. Potentiometer 52 divides $r_z'$ (the signal expressing the pitch component of the remaining range vector to the target) by $r_x'$ and provides an output signal to resistor 53. This signal represents the pitch error angle. Resistor 54 receives the signal representing angle of attack, $\alpha$, which is subtracted from the signal through resistor 53 according to Equation 13 to provide an output at 55, which is the steering error signal in pitch. It is clear that depending on convention chosen and sense of the angle of attack and skid, they may be added or subtracted.

This device, then, is a continuous computer of the remaining range vector to the target which operates despite previous departure from an original path or a direct path to the target. The device takes into consideration cross-products and errors introduced by reason of the angular velocities of the missile. Basically, it operates to receive an initial range, subtracts from the initial range the integrated velocities (including cross-product terms) and provides signals as to the remaining range components and uses these remaining range components to provide signals representing steering errors.

Although the invention has been described and illustrated in detail, it is to be clearly understood that the same is by way of illustration and example only and is not to be taken by way of limitation, the spirit and scope of this invention being limited only by the terms of the appended claims.

I claim:

1. A guidance system computer comprising means for receiving signals representing initial range to a target, means providing signals representing missile velocity, means providing signals indicating missile angular velocity, means connected to receive and perform a vector integration on said signals of missile velocity and angular velocity, means for subtracting said integrated velocity and angular velocity signals from said received initial range signals.

2. A guidance system computer comprising means for receiving signals representing initial range to a target, said signals representing three vector components, means providing signals representing missile velocity, said signals expressed in components of a vector, means providing signals representing missile angular velocity, said signals representing three vector components, means connected to receive and perform a vector integration on said signals of missile velocity and angular velocity, means for subtracting said integrated velocity and angular velocity components from said initial range components whereby the remaining range to target is obtained.

3. A missile guidance system computer comprising means for receiving signals representing initial range to target, said signals expressed in components of a vector, means providing signals representing missile velocity and missile angular velocity, said signals being expressed in components relative to the body of said missile, means connected to receive and perform a vector integration on said signals of missile velocity and missile angular velocity, means for subtracting said integrated velocity signals from said received range signals.

4. A missile guidance system computor providing means for receiving signals representing initial range to a target, said signals representing vector components, means for providing signals representing missile velocity and missile angular velocity, said signals expressed in components of a vector oriented by the orientation of said missile, means connected to receive and perform a vector integration on said signals of missile velocity and missile angular velocity, means for subtracting said integrated velocity and angular velocity signals from said received range signals, providing signals representing remaining range components, and means for dividing at least one of said range components by at least one other of said range components to provide a steering signal for said missile.

5. The combination recited in claim 4 wherein is included means for substracting a signal representing a flight attitude angle relative to the course of travel from said steering signal.

6. A missile guidance system computor comprising means for receiving signals representing an initial range to a target, said signals expressed in the components of a vector, means for providing signals representing missile airspeed, said signals expressed in components of a vector, means providing signals indicating missile angular velocity about at least one axis of said missile, means providing signals representing vector cross-product terms arising by reason of said angular velocity, means for integrating said signals representing components of said missile velocity vector and said signal representing vector cross-product terms, means for subtracting said integrated velocity vector signals from said initial range signals, providing signals representing components of the remaining range vector to the target.

7. The combination recited in claim 6 wherein is included means for dividing at least one of said signals representing a component of remaining range vector by another of said signals representing a component of remaining range vector to the target whereby an error angle is provided.

8. A missile guidance system computor comprising means for receiving signals representing an initial range to a target, said signals representing three components of a vector, means providing signals representing the velocity vector components along the pitch, roll and yaw axes of said missile, means providing angular velocities of said missile about its pitch, roll and yaw axes, means providing signals representing missile angular velocity about the pitch, yaw and roll axes, means for computing the vector cross-product velocity errors introduced by angular velocity of said missile about said axes, means for combining said signals representing velocity vector components with said signals representing vector cross-product terms, means for integrating said combined signals, means for subtracting said integrated combined signals from said initially received range signals.

9. In a missile guidance system, means for receiving signals representing an initial range to a target, said signals expressed in the components of a vector, means for providing signals representing vector components of missile airspeed, means providing signals indicating missile angular velocity about at least one axis of said missile, means for computing velocity errors introduced by vector cross-product terms by reason of said angular velocity, means for combining said signals representing vector components of missile airspeed and said signals representing vector cross-product terms, means for integrating said combined signals, means for subtracting said integrated combined signals from said received range signals, providing signals representing the forward, yaw and pitch components of the remaining range vector to the target.

10. The combination recited in claim 9 wherein is included means for dividing said signal representing the yaw component of the remaining range vector by a said signal representing the forward component of remaining range vector, providing a yaw error angle signal and wherein is included means for dividing said signal representing the pitch component of the remaining range vector by the forward component of the remaining range vector, providing a pitch error angle signal.

11. The combination recited in claim 9 wherein is included means for dividing said signal representing the yaw component of the remaining range vector by a said signal representing the forward component of remaining range vector, providing a yaw error angle signal and wherein is included means for dividing said signal representing the pitch component of the remaining range vector by the forward component of the remaining range vector, providing a pitch error angle signal, and wherein is included means providing signals indicating angle of skid and means providing signals indicating angle of attack and means for combining said signal representing angle of skid from said signal representing yaw error angle, and means for combining said signal representing angle of attack from said signal representing pitch error angle whereby steering signals in yaw and pitch are provided.

12. In a missile guidance system, means for receiving signals representing an initial range to a target, said signals provided in the three components of a vector, means providing signal representing missile velocity, said signals provided in three components along the pitch, roll and yaw axes of said missile, gyroscopic means providing angular velocities of said missile about its pitch, roll and yaw axes, means for providing signals representing the cross-product velocity terms introduced by angular velocity of said missile about said axes, means for combining said signals representing cross-product velocity terms with said signals representing components of missile velocity, means for integrating said combined missile velocity signals, means for subtracting said integrated combined missile velocity signals from said initially received range signals providing signals representing remaining range to the target expressed in three components of a vector along the pitch, yaw and roll axes of said missile, means for dividing the signal representing the range component in yaw by the signal representing the range component along the roll axis, providing a signal representing the yaw angle to the target, and means dividing the signal representing the range component in pitch by the signal representing the range component along the roll axis providing a signal representing the pitch angle to the target.

13. The combination recited in claim 12 wherein is included means for producing a signal representing the angle of skid, means for combining the signal representing the angle of skid from said signal representing yaw angle and wherein is included means providing a signal representing angle of attack, means for combining the signal representing angle of attack from said signal representing pitch angle, whereby yaw and pitch steering error signals are obtained.

14. In a guidance system, three motors, a respective rate generator driven by each said motor, a respective first and second potentiometer whose wipers are driven by each said motor, three rate gyros whose input axes are disposed in pitch, roll and yaw, said potentiometers connected to receive signals representing angular velocity in pitch, roll and yaw from said rate gyros, airspeed computer means providing signals representing airspeed expressed in three components of a vector, said motors each connected to receive a signal representing an airspeed component, a negative feedback component from its respective rate generator and the output from the wiper of at least one potentiometer driven by another of said motors whereby the rotation of the shafts of said motors represents distance traveled.

15. The combination recited in claim 14 wherein is included means for servo positioning the shafts of said motors to an original position.

16. The combination recited in claim 14 wherein is included three further potentiometers, the wiper of each connected to be driven by a respective motor, a D.-C. source connected to said further potentiometers, switch means disposed to connect the electrical signals from said wipers of said further potentiometers in feedback to said motors and disconnect said airspeed computer means, a fourth and fifth potentiometer whose wipers are driven by one of said motors, said potentiometers connected to receive the electrical signals from the wipers of the two further potentiometers driven by the other motors, the wipers of said fourth and fifth potentiometers providing signals representing error angles.

17. The combination recited in claim 14 wherein is included three further potentiometers, the wiper of each connected to be driven by a respective motor, a D.-C. source connected to said further potentiometers, switch means disposed to connect the electrical signals from said wipers of said further potentiometers in feedback to said motors and disconnect said airspeed computer means, a fourth and fifth potentiometer whose wipers are driven by one of said motors, said potentiometers connected to receive the electrical signals from the wipers of the two further potentiometers driven by the other motors, the wipers of said fourth and fifth potentiometers providing signals representing error angles, means providing a signal representing angle of skid, means for providing a signal representing angle of attack, means for combining the signal representing angle of skid with the signal from the wiper of said fourth potentiometer, means for combining the signal representing angle of attack with the signal from the wiper of said fifth potentiometer whereby steering error angle signals are provided for steering a vehicle carrying said guidance system so as to drive said error angle signals to zero.

References Cited in the file of this patent

UNITED STATES PATENTS

| 2,368,673 | Metcalf | Feb. 6, 1945 |
| 2,560,527 | Dehmel | July 10, 1951 |
| 2,619,623 | Meridith | Nov. 25, 1952 |
| 2,644,941 | Kellogg | July 7, 1953 |
| 2,670,911 | Harcum | Mar. 2, 1954 |
| 2,696,947 | Hauser et al. | Dec. 14, 1954 |
| 2,766,953 | Cummings | Oct. 16, 1956 |

OTHER REFERENCES

The Gyroscope Applied, K.I.T. Richardson, 1954, Philosophical Library, Inc., pp. 292–300.

UNITED STATES PATENT OFFICE
CERTIFICATE OF CORRECTION

Patent No. 3,010,676 November 28, 1961

Rulon G. Shelley

It is hereby certified that error appears in the above numbered patent requiring correction and that the said Letters Patent should read as corrected below.

Column 6, line 10, after "angle" insert -- signal --.

Signed and sealed this 31st day of July 1962.

(SEAL)
Attest:

ERNEST W. SWIDER
Attesting Officer

DAVID L. LADD
Commissioner of Patents

UNITED STATES PATENT OFFICE
CERTIFICATE OF CORRECTION

Patent No. 3,010,676                          November 28, 1961

Rulon G. Shelley

It is hereby certified that error appears in the above numbered patent requiring correction and that the said Letters Patent should read as corrected below.

Column 6, line 10, after "angle" insert -- signal --.

Signed and sealed this 31st day of July 1962.

(SEAL)
Attest:

ERNEST W. SWIDER                              DAVID L. LADD
Attesting Officer                                  Commissioner of Patents